US008696358B2

(12) United States Patent
Flanagan

(10) Patent No.: US 8,696,358 B2
(45) Date of Patent: Apr. 15, 2014

(54) SYSTEM AND METHOD FOR FACILITATING RESPONSIBLE BEHAVIOUR

(76) Inventor: John Thomas Flanagan, Melbourne Victoria (AU)

( * ) Notice: Subject to any disclaimer, the term of this patent is extended or adjusted under 35 U.S.C. 154(b) by 874 days.

(21) Appl. No.: 10/566,042

(22) PCT Filed: Aug. 27, 2004

(86) PCT No.: PCT/AU2004/001161
§ 371 (c)(1),
(2), (4) Date: Feb. 8, 2008

(87) PCT Pub. No.: WO2005/022453
PCT Pub. Date: Mar. 10, 2005

(65) Prior Publication Data

US 2008/0199838 A1 Aug. 21, 2008
US 2009/0191523 A2 Jul. 30, 2009

(30) Foreign Application Priority Data

Aug. 27, 2003 (AU) ................................ 2003904611

(51) Int. Cl.
*G09B 19/00* (2006.01)

(52) U.S. Cl.
USPC ........................................... 434/236; 434/238

(58) Field of Classification Search
USPC ............................... 434/236, 238; 463/25, 29
See application file for complete search history.

(56) References Cited

U.S. PATENT DOCUMENTS 5,470,079 A 11/1995 LeStrange et al.
5,596,994 A * 1/1997 Bro ............................... 600/545
5,961,332 A * 10/1999 Joao ............................. 434/236
5,967,789 A * 10/1999 Segel et al. ................... 434/236
6,039,688 A * 3/2000 Douglas et al. ............... 600/300
6,553,386 B1 * 4/2003 Alabaster ............................. 1/1
6,859,788 B1 * 2/2005 Davey ......................... 705/36 R
2001/0029319 A1 * 10/2001 Kazlausky et al. ........... 600/300

(Continued)

FOREIGN PATENT DOCUMENTS

CA 2 331 238 A1 7/2001
JP 8-180115 7/1996

(Continued)

OTHER PUBLICATIONS

PCT International Search Report from International Application No. PCT/AU2004/001161 dated Oct. 1, 2004.

(Continued)

*Primary Examiner* — Bruk Gebremichael
(74) *Attorney, Agent, or Firm* — Patterson & Sheridan, LLP

(57) ABSTRACT

A system (2) for facilitating responsible behavior by an entity comprising an identification means (32) for identifying the entity, a facility (4) for verifying the identification means and facilitating pursuit of the behavior, a storage means (18) coupled to be in communication with the facility (4) for storing information related to the pursuit of the behavior by the entity, a modeler module (24) for comparing the information related to the pursuit of the behavior by the entity with a behavior model to determine a category of behavior of the entity and a resolver module (22) for determining one or more actions to be initiated in relation to the entity and their pursuit of the behavior such as initiating a change to one or more operating parameters of the facility (4) in response to the activation of one or more limits, blocks or triggers related to the entity.

39 Claims, 8 Drawing Sheets

(56) References Cited

U.S. PATENT DOCUMENTS

| | | | | |
|---|---|---|---|---|
| 2001/0031663 | A1* | 10/2001 | Johnson | 463/42 |
| 2002/0123923 | A1* | 9/2002 | Manganaris et al. | 705/10 |
| 2002/0133377 | A1* | 9/2002 | Brown | 705/3 |
| 2002/0138461 | A1 | 9/2002 | Sinclair et al. | |
| 2002/0142824 | A1 | 10/2002 | Kazaoka et al. | |
| 2003/0003983 | A1* | 1/2003 | Walker et al. | 463/16 |
| 2003/0031321 | A1 | 2/2003 | Mages | |
| 2003/0037063 | A1* | 2/2003 | Schwartz | 707/104.1 |
| 2003/0069802 | A1 | 4/2003 | Ramsey-Catan | |
| 2003/0101076 | A1* | 5/2003 | Zaleski | 705/2 |
| 2003/0108849 | A1* | 6/2003 | Hodges | 434/236 |
| 2003/0131265 | A1 | 7/2003 | Bhakta | |
| 2004/0063082 | A1* | 4/2004 | O'Donnell | 434/238 |
| 2004/0067475 | A1* | 4/2004 | Niddrie et al. | 434/236 |
| 2004/0219982 | A1* | 11/2004 | Khoo et al. | 463/42 |
| 2004/0230530 | A1* | 11/2004 | Searl et al. | 705/51 |
| 2004/0247748 | A1* | 12/2004 | Bronkema | 426/106 |
| 2005/0037323 | A1* | 2/2005 | Basson | 434/236 |

FOREIGN PATENT DOCUMENTS

| | | |
|---|---|---|
| JP | 11-099847 | 4/1999 |
| JP | 2002-109440 | 4/2002 |
| WO | WO 98/52136 | 11/1998 |
| WO | WO 01/63439 A1 | 8/2001 |
| WO | WO 02/01427 | 1/2002 |

OTHER PUBLICATIONS

Supplemental EP Search Report, Application No. EP 04 76 1198, dated May 11, 2007.

* cited by examiner

SYSTEM AND METHOD FOR FACILITATING RESPONSIBLE BEHAVIOUR

FIELD OF THE INVENTION

The invention relates to a system and method for facilitating responsible behaviour. In particular, although not exclusively, the invention relates to a system and method that aids the prevention and detection of problem gambling and other categories of gambling behaviour and the provision of assistance to address problem gambling. However, it is envisaged that the present invention is applicable to problem behaviour other than problem gambling, such as, but not limited to, alcoholism and shopping.

BACKGROUND TO THE INVENTION

Problem behaviour, that can easily and quickly become compulsive addictive behaviour, is manifest in many forms such as gambling, shopping, alcoholism, substance abuse, spending, such as with credit cards, borrowing and other such activities.

For example, gaming or gambling in all its forms, whether it be placing bets on horse races or football matches, playing gaming tables such as roulette, black jack or craps in casinos or playing slot machines (the "pokies"), is a very popular pastime. For example, it has been estimated that there are approximately 3 million people who gamble regularly in the state of Victoria, Australia alone, representing approximately 15% of the Australian population.

In addition to the excitement and entertainment that gambling provides, gambling also provides the opportunity to win large sums of money. However, all too often gambling involves the gambler losing money and gambling further in an attempt to recoup their losses. It is well known that gambling can also become addictive.

The consequences of such problem gambling are not limited to the problem gambler going into financial debt, but extend to the friends and family of the problem gambler and the wider community as a whole with knock on effects such as theft in order to obtain money with which to gamble, stress, the breakdown of relationships and the loss of employment.

For example, in Australia 2.1% of gamblers are estimated to have a gambling problem. 140,000 gamblers are estimated to have a severe gambling problem with 1 in 10 having seriously contemplated suicide due to their gambling habits. Since 1992, some 7,200 children in Victoria, Australia have become homeless due to problem gambling and some 30,000 families in Victoria were adversely affected by problem gambling in 2000/2001. Underage gambling is also a problem with an estimated 200,000 adolescent gamblers in Australia. Adolescent gambling is particularly detrimental since the individual is less likely to have a disposable income to fund the pursuit and the education of the adolescent usually suffers as a consequence of their gambling.

Currently, there is minimal assistance for problem gamblers. One form of assistance is provided by self-help groups such as Gamblers Anonymous. However, such assistance relies on the gambler firstly recognising their problem and secondly the gambler seeking help for themselves. In such situations, the problem has already occurred and a solution needs to be found.

Some casinos display responsible gambling notices and/or booklets providing brief advice and telephone numbers where assistance may be sought. However, these also rely on self-help and the provision of assistance once the problem has occurred. In any event, casinos and other gaming establishments are in the business of generating revenue and they do not want to deter gamblers who are capable of gambling within their limits and who have the willpower to stop gambling of their own volition.

A corollary of the situation is that despite the aforementioned detrimental effects of problem gambling, gambling in general generates enormous revenue for governments and as a result governments have become dependent to a certain extent on such revenue for the provision of various government services.

The issue and associated consequences of problem gambling and addicted gamblers have become reasonably common knowledge and the public backlash has included calls for the curtailment of gambling venues and tighter restrictions on gambling. Many are worried that gambling may be outlawed altogether, which would not only deprive millions of people of the entertainment provided by gambling, but would also result in the loss of thousands of jobs and a substantial deficit in government funds.

Despite the above estimates and survey evidence and the recognition that a real problem exists, a further problem is that there is a lack of objective data and statistics that can be relied upon with certainty.

One attempt at addressing one aspect of the problem has been the limited introduction by casinos of individual gambling limits, whereby gamblers impose their own monetary limits on their gambling. However, this system is purely voluntary and is likely to only be used by gamblers who are reasonably responsible in the first place and therefore less likely to become problem gamblers. Furthermore, the system is open to abuse since the gambler can merely gamble at an alternative venue or choose not to use any casino membership card they may have to enable them to continue gambling if their self-imposed limit has been reached or exceeded.

WO 01/63439 discloses another attempt at addressing problem gambling in the form of a system and a smart card for regulating gambling. The system includes linkages to financial resources to facilitate transfer of funds to the card and from the card to the gaming venue for gambling purposes. The card comprises a clock means and an electronic purse to limit an electronic value input and/or output from the purse in a predefined period. A clock lock feature enables the purse to be locked after a predetermined period of use or during a particular period, such as during working hours, in an attempt to guard against problem gambling. Whilst this system provides some mechanisms for addressing some of the aforementioned problems, it is somewhat inflexible and does not have the capacity to consider all the factors relevant to potentially problem gambling or other potentially problem behaviour.

A further attempt at addressing problem gambling is disclosed in Canadian patent application no. 2,331,238. This document discloses a "safe gaming" system comprising an interface between online gaming individuals and internet-based gambling websites. Players at traditional gambling venues such as casinos can also participate in the system using a pass card or smart card that is used in the same slot as, or integrated with, conventional reward cards issued by gaming establishments. A player agrees to gaming control parameters such as financial and/or time limitations established through a registration process. Monitoring software tracks the player's gambling activity and intervenes with warning messages regarding approaching or exceeded limits and has the capability to terminate gambling activities when limits are reached.

One problem with this system is that the gaming control parameters are based on the player's responses to a questionnaire during the registration process. Whilst this system therefore has the capacity to consider other factors relevant to gambling, this system relies on the player honestly disclosing their circumstances and accurately recalling their gambling habits and behaviour. Furthermore, the player has the option to accept or decline parameters suggested by the system or specify their own parameters. Therefore, the gaming control parameters against which the player's gambling activity is compared have the potential to be inaccurate thus risking potential, or actual, problem gambling not being detected.

The aforementioned problems and consequences in relation to gambling are often equally applicable to other problem/compulsive addictive behaviour such as alcoholism, other substance abuse, shopping and spending.

Hence, there is a need for a system, method and/or apparatus for facilitating responsible behaviour that identifies those with a problem or those exhibiting behaviour that may become problematic without relying on information disclosed by the individual concerned to make such identification. Preferably such a system, method and/or apparatus aids individuals exhibiting problematic or potentially problematic behaviour seek assistance, prevents the behaviour from becoming more problematic, such as becoming compulsive addictive behaviour and/or prevents further pursuit of the behaviour if such behaviour has become problematic. In relation to, for example, gambling, there is a need for a system, method and/or apparatus that identifies those with a gambling problem or those exhibiting gambling behaviour that may become problematic without relying on information disclosed by the individual concerned to make such identification. Preferably, such a system, method and/or apparatus aids problem gamblers seek assistance, prevents gamblers from becoming problem gamblers and/or prevents identified problem gamblers from further gambling. Another desirable characteristic is a system, method and/or apparatus that can collate statistics to enable more accurate assessment and monitoring of problem behaviour that can be utilised to ameliorate the problem behaviour further.

In this specification, the terms "comprises", "comprising" or similar terms are intended to mean a non-exclusive inclusion, such that a method, system or apparatus that comprises a list of elements does not include those elements solely, but may well include other elements not listed.

In this specification, the term "gambler" is intended to mean any person who interacts with a gambling facility and is not limited to persons who may be classified as gamblers, who gamble on a regular basis or gamble a particular amount of money. Similarly, terms referring to people partaking of other activities, such as "shopper", "borrower" or "consumer of intoxicating substances", are not limited to persons who partake in these activities to any predetermined extent.

SUMMARY OF THE INVENTION

In one form, although it need not be the only or indeed the broadest form, the invention resides in a system for facilitating responsible behaviour, said system comprising:

an identification means for identifying the entity;

a facility for verifying the identification means and facilitating pursuit of the behaviour;

a storage means coupled to be in communication with the facility for storing information related to the pursuit of the behaviour by the entity; and a modeler module for comparing the information related to the pursuit of the behaviour by the entity with a behaviour model to determine a category of behaviour of the entity.

Preferably, the behaviour model describes one or more categories of the behaviour.

Suitably, the modeler module compares the information related to the pursuit of the behaviour by the entity with a model describing earlier behaviour of the entity.

Suitably, the modeler module compares the information related to the pursuit of the behaviour by the entity with a model describing behaviour of a distribution of other entities.

Preferably, the behaviour model comprises one or more criteria related to the behaviour.

Suitably, the criteria include one or more of: acceleration criterion, chasing losses criterion, frequency criterion, duration criterion, an inter-behaviour criterion, an income proportion criterion, an age criterion, a sex criterion, an override criterion, a disposable income criterion, a proportion of time spent employed criterion.

Preferably, in determining the category of behaviour of the entity, the modeler module considers whether any limits, blocks, triggers and/or exclusions related to the entity have been activated or overridden or whether attempts have been made by the entity to override the limits, blocks, triggers and/or exclusions.

Suitably, the modeler module attributes a different weight to the entity overriding or attempting to override a limit, trigger, block and/or exclusion generated by the behaviour model than to the entity overriding or attempting to override a self-imposed limit, trigger, block and/or exclusion.

Suitably, in response to the activation of one or more limits, blocks or triggers related to the entity, a targeted message is sent to the entity. The targeted message may be one or more of: an electronic message sent to the facility, an SMS message sent to a portable communication device of the entity, an email sent to an email address of the entity, mail sent to a mailing address of the entity, a verbal message delivered in person to the entity.

Suitably, in response to the activation of one or more limits, blocks or triggers related to the entity, the resolver module initiates a change to one or more operating parameters of the facility. The changes to one or more operating parameters of the facility may include: preventing pursuit of the behaviour, periodically preventing pursuit of the behaviour, limiting a maximum monetary amount spent for each pursuit of the behaviour, limiting a maximum length of time the behaviour can be pursued, limiting a number of times the behaviour can be pursued simultaneously, limiting a number of times the behaviour can be pursued consecutively, reducing the speed at which the behaviour can be pursued.

Preferably, the modeler model considers whether any limits, blocks or triggers related to the entity have been activated in determining the category of behaviour of the entity.

Suitably, the system further comprises a resolver module for checking whether limits, blocks or triggers related to the entity have been activated.

Suitably, the system further comprises a referrer module for updating information stored in relation to an entity where the entity has been referred for assistance in relation to their behaviour.

Suitably, the system further comprises a reporter module for generating reports about the pursuit of the behaviour of an entity.

Preferably, the identification means stores only a unique identifier for identifying the entity and no other information relating to the entity.

Suitably, the identification means is an electronic wallet.

In another form, the invention resides in a method for facilitating responsible behaviour by an entity, said method including the steps of:

verifying an identification means identifying the entity;

facilitating pursuit of the behaviour via a facility;

storing information related to the pursuit of the behaviour by the entity in a storage means coupled to be in communication with the facility;

comparing the information related to the pursuit of the behaviour by the entity with a behaviour model; and determining a category of behaviour of the entity.

Suitably, the step of comparing includes comparing the information related to the pursuit of the behaviour by the entity with a model describing earlier behaviour of the entity.

Suitably, the step of comparing includes comparing the information related to the pursuit of the behaviour by the entity with a model describing behaviour of a distribution of other entities.

Preferably, the step of comparing includes comparing the information related to the pursuit of the behaviour by the entity with one or more criteria related to the behaviour.

Suitably, the criteria include one or more of: acceleration criterion, chasing losses criterion, frequency criterion, duration criterion, an inter-behaviour criterion, an income proportion criterion, an age criterion, a sex criterion, an override criterion, a disposable income criterion, a proportion of time spent employed criterion.

Suitably, the step of determining includes considering whether any limits, blocks or triggers related to the entity have been activated.

Preferably, the step of determining includes considering whether any limits, blocks, triggers and/or exclusions related to the entity have been overridden or have been attempted to be overridden.

Suitably, the step of determining includes attributing a different weight to the entity overriding or attempting to override a limit, trigger, block and/or exclusion generated by the behaviour model than a weight attributed to the entity overriding or attempting to override a self-imposed limit, trigger, block and/or exclusion.

The method may further include the step of sending a targeted message to the entity in response to the activation of one or more limits, blocks and/or triggers related to the entity.

The method may further include the step of initiating a change to one or more operating parameters of the facility in response to the activation of one or more limits, blocks and/or triggers related to the entity.

Suitably, the method further includes the step of referring the entity for assistance in relation to their behaviour.

Suitably, the entity is referred for assistance following categorization of the behaviour of the entity as being at risk behaviour, problem behaviour or compulsive/addictive behaviour or a sub-category thereof.

Suitably, the method further includes the step of generating reports about the pursuit of the behaviour of an entity.

Suitably, the method further includes the step of the identification means storing only a unique identifier for identifying the entity and no other information relating to the entity.

Suitably, the method further includes storing money electronically in the storage means or on the identification means for pursuit of the behaviour.

Further features of the present invention will become apparent from the following detailed description.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein.

DETAILED DESCRIPTION OF THE INVENTION

Embodiments of the present invention will be described in relation to a system and method for facilitating responsible gambling. However, it will be appreciated that the present invention is not limited to this application and it may be applied to other forms of behaviour that may become problematic or compulsive addictive, such as, but not limited to, shopping, the consumption of intoxicating substances such as alcohol, borrowing or spending money and the like. Hence, the reader will appreciate that reference herein to, for example, a gambler, in another application of the present invention, may refer to another relevant entity, such as a shopper, a borrower, a spender or a consumer of intoxicating substances. Similarly, reference herein to a gambling facility, in another application may be, for example, a shopping facility such as an EFTPOS machine or ATM. Furthermore, the models and criteria for diagnosing categories of behaviour such as “at risk” behaviour, problem behaviour, and/or compulsive addictive behaviour and/or other categories or subcategories of behaviour referred to herein will vary depending on the particular application of the present invention.

Embodiments of the present invention will be described with reference to an entity in the form of a gamer/gambler playing a gaming table such as, but not limited to, a roulette table, craps table or black jack table or an electronic gaming machine (“pokie”) at a venue such as a casino or club. However, it will be appreciated that the present invention is not limited to these applications and the present invention may be employed in other gambling scenarios such as betting shops, racecourses for horses, greyhounds, trotting and the like, other competition venues, Internet gambling, Keno, lotto and the like.

Figure 1:
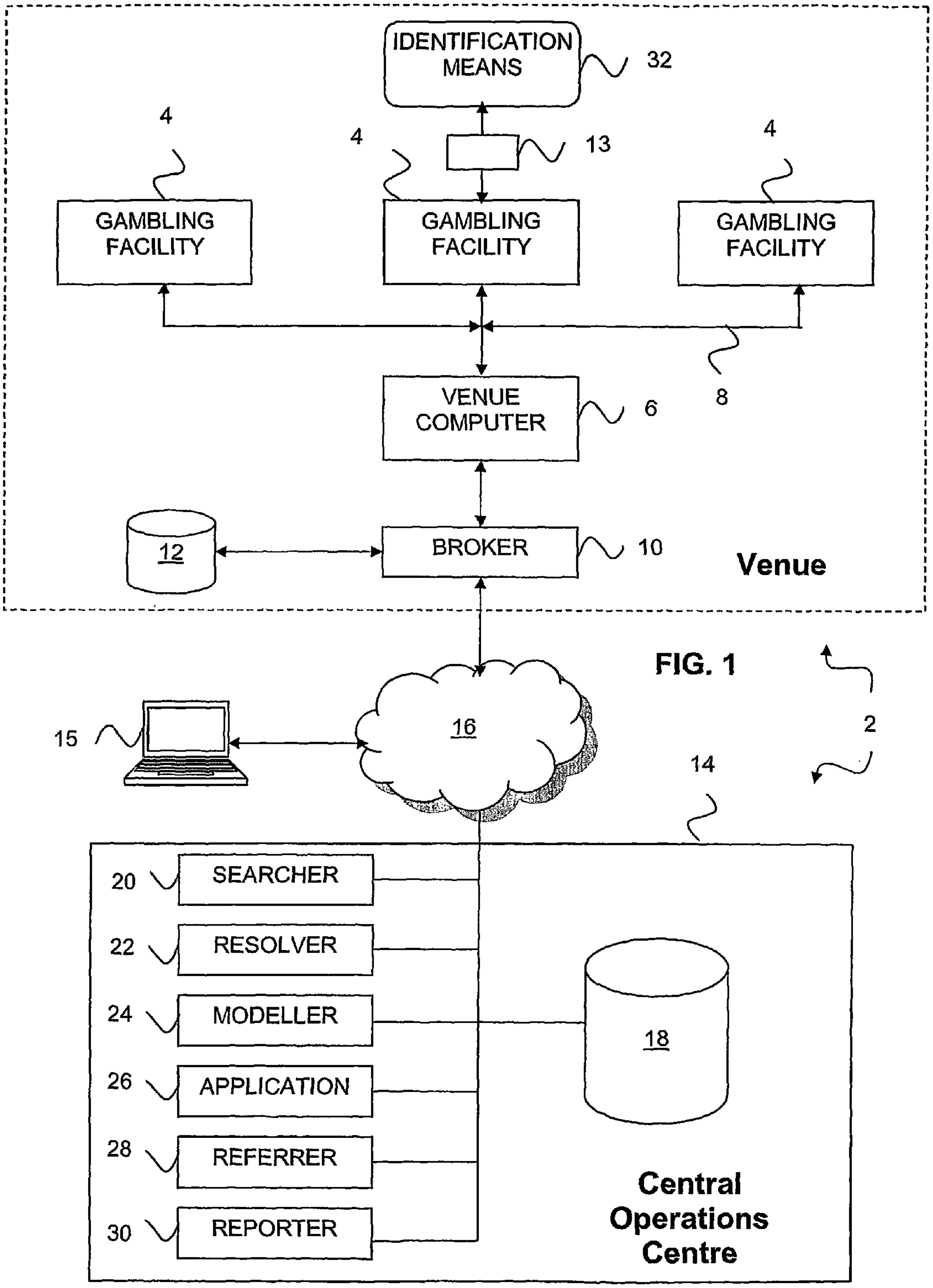
FIG. 1 shows the system according to an embodiment of the present invention.

With reference to FIG. 1, the system 2 according to one embodiment of the present invention comprises one or more gambling facilities 4 such as a roulette table, electronic gaming machine (e.g. poker machine) or the like that is coupled to be in communication with a venue computer 6 by, for example, a local area network (LAN) 8. The venue computer 6 is coupled to be in communication with a broker/updater module 10. The broker/updater module 10 is coupled to be in communication with local storage means in the form of local database 12, which is offline and only accessible by the venue computer 6 via the broker/updater module 10. The broker/ updater module 10 is coupled to be in communication with a central operations center (COC) 14 via a communications network 16 such as the Internet. Although the central operations center 14 is shown in FIG. 1 as being in a separate location from the gaming venue, it will be appreciated that the system of the present invention is not limited to such an arrangement and the central operations center 14 may reside within the same or a different gaming venue.

Central operations center 14 comprises a storage means in the form of central database 18, which is coupled to be in communication with a searcher module 20, a resolver module 22, a modeler module 24, an application module 26, a referrer module 28 and a reporter module 30.

The system 2 also comprises identification means 32 to identify a gamer/gambler, which may be in the form of, for example, a card comprising a magnetic strip or an integrated circuit for storing information relating to the gambler. Alternatively, the identification means 32 could be a key ring or other portable device capable of transmitting a signal, such as an RF signal, indicative of information stored in the identification means. A person skilled in the art will appreciate that the present invention is not limited to the particular type of identification means employed.

In one embodiment, the present invention requires that every person within a particular jurisdiction, e.g. state, territory, county or other area, or within a particular zone of gambling activity, e.g. particular gambling venue, wishing to gamble holds an identification means 32. Without identification means 32 the gambler is unable to gamble. Hence, whilst all persons within a particular jurisdiction, such as a state, may not all have the identification means 32, all persons wishing to gamble in, for example, a particular casino will require identification means 32 to gamble. Preferably, one valid identification means 32 will permit gambling in multiple gambling venues in a particular jurisdiction.

In a preferred embodiment, for security purposes the identification means 32 comprises information in the form of only a number or other unique identifier for the gambler and no other information. The balance of the information relating to the gambler is stored on the central database 18 to facilitate efficient and economical central updating of the information relating to the gambler. This obviates the necessity of having to update information on the identification means 32 or having to reissue replacement identification means. This embodiment also enables any regulatory changes and/or requirements that may affect the information to be effected easily without the need to recall the identification means 32 and/or re-issuing replacement identification means.

Figure 2:
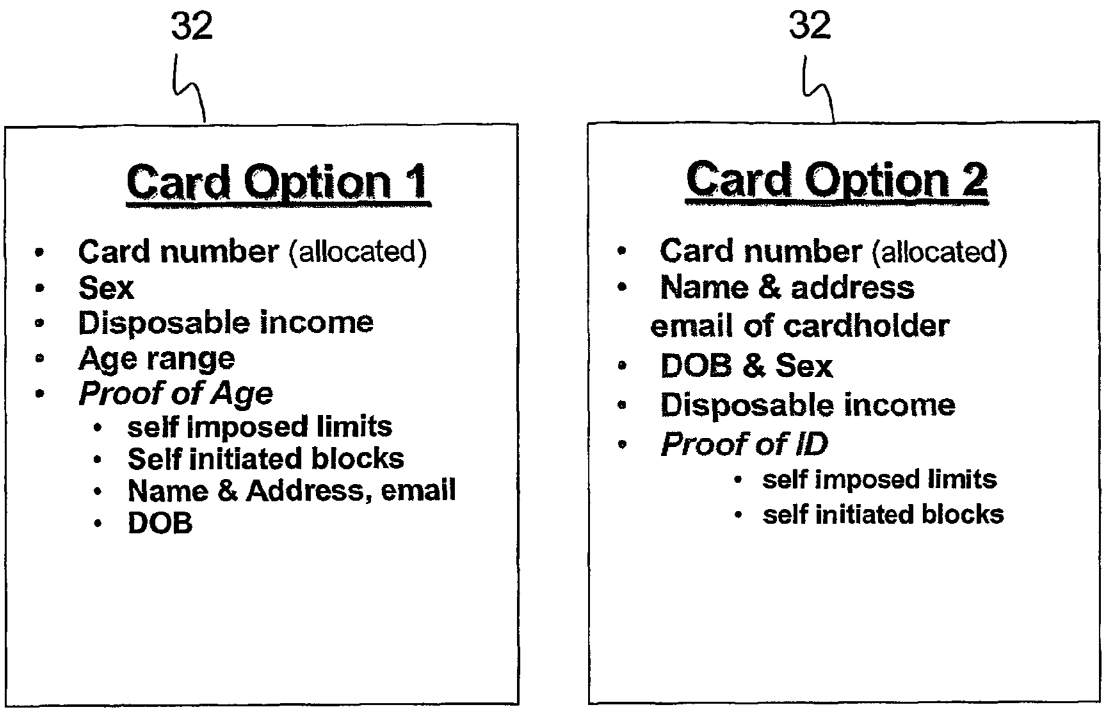
FIG. 2 shows examples of information that may be stored by the identification means of the system shown in FIG. 1.

Alternatively, identification means 32 may comprise additional information, such as that shown in FIG. 2 in a storage means. The information stored in the storage means of the identification means 32 will depend on the option selected. Therefore, in this alternative embodiment, the identification means 32 may be in the form of a card comprising a magnetic strip and a storage means in the form of an integrated circuit (IC) with the unique identifier stored by the magnetic strip and further information, such as that shown in FIG. 2, stored in the integrated circuit. In a further alternative embodiment, an IC alone may be employed for storing both the unique identifier and the further information.

The information exampled in FIG. 2 will depend on the type of behaviour with which the present invention is concerned. Where the behaviour concerned is gambling, in an embodiment where the identification means 32 and/or storage means 18 stores information other than just the unique identifier for the gambler, such as an identification number, the identification means 32 and/or storage means 18 stores the following information: sex, disposable income, an age range in which the gambler fits and/or proof of age. For this option, the identification means 32 and/or storage means 18 may also store the following information: name, address, email address, portable communication device contact number, date of birth, one or more self-imposed gambling limits and/or one or more self-initiated blocks that can prevent the owner of the card from gambling at the owner's election. The only mandatory information required to obtain the identification means 32 is valid proof of age. The only mandatory information stored on the identification means and storage means 18 is the unique identifier. Hence, in one embodiment, once a gambler has proved their age, it is possible for the gambler to gamble anonymously in the sense that they are identified only by the unique identifier.

Since it is possible for the gambler to acquire the identification means 32 to enable gambling without providing a name and/or address, in one embodiment, resources will be directed to the gambling facility 4 being used by the gambler, the gambling facility 4 being identified when the gambler uses their identification means 32. Information can then be communicated to the gambler via the gambling facility 4 in the form of, for example, targeted messages warning of approaching, reached or exceeded limits, enquiries as to whether the gambler wishes to continue gambling or notifications that further gambling has been blocked. Communication with the gambler may alternatively be in the form of human intervention, such as a gambling venue employee making contact with the gambler and delivering a targeted message in person. The gambler can be physically located by virtue of the gambling facility 4 at which they are playing. Communication with the gambler can alternatively or additionally be via an email sent to an email address of the gambler, mail sent to a physical mailing address or an SMS message sent to a portable communication device of the gambler, such as a mobile phone or PDA, depending to the correspondence information provided by the gambler and the urgency of the targeted message. For example, a targeted message informing the gambler of an exceeded limit would preferably be sent via an immediate communication means, such as via the gambling facility 4, or via SMS message. Email may be an appropriate communication means where the gambling facility is provided by, for example, a web server for Internet gambling.

In the second option shown in FIG. 2, the identification means and/or storage means 18 stores the following mandatory information: identification number, name, address, email address, date of birth, sex, disposable income, and a proof of age. For this option, the identification means and/or storage means 18 may also store one or more self-imposed gambling limits and/or a self-initiated block. Since an address is provided, resources may be directed to this known point. However, in the event that the gambler has moved without the system being updated or the address provided is false, the resources of the present invention referred to above can be directed to the gambler as described above for the first option.

Figure 7:
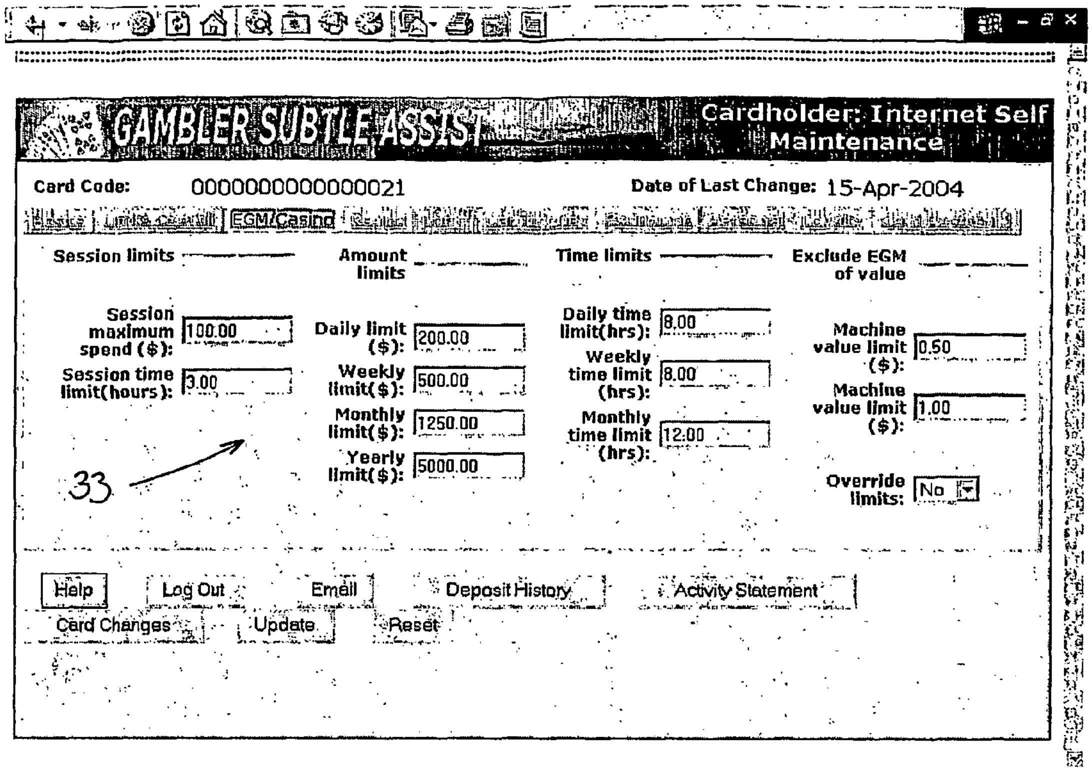
FIG. 7 is a screenshot showing an embodiment of the invention in which a gambler may specify limits in relation to their gambling.
Figure 8:
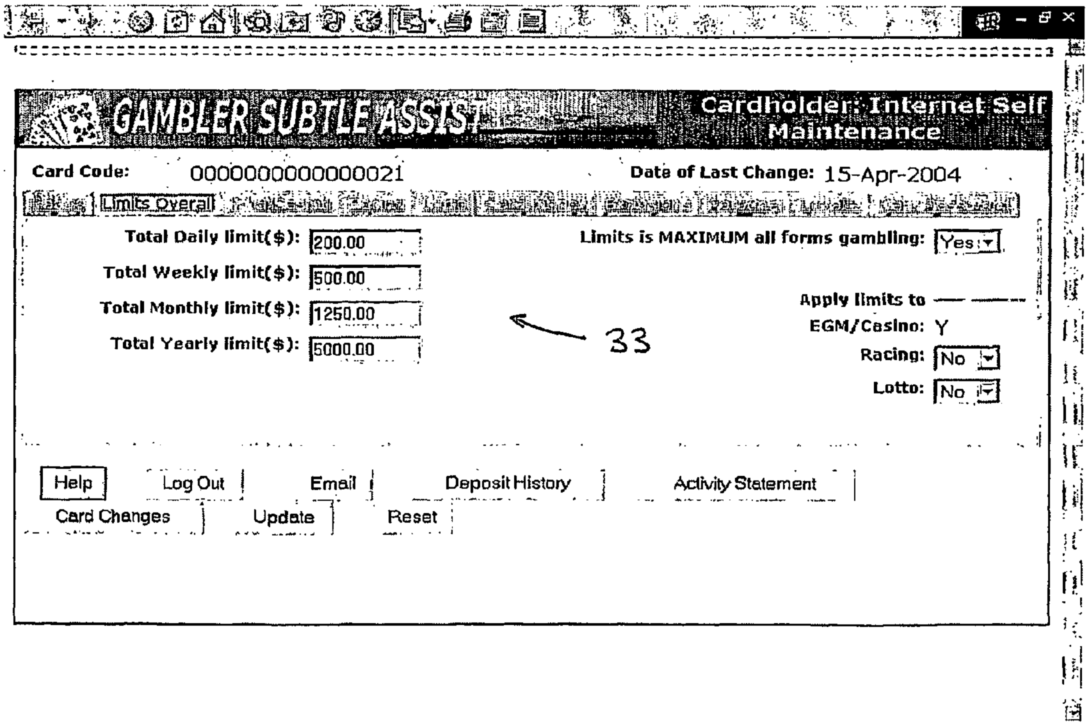
FIG. 8 is an alternative screenshot to that shown in FIG. 7.

With reference to FIGS. 7 and 8, the self-imposed gambling limits 33 and/or self-initiated blocks and/or self-exclusions can be tailored to the gambler's needs, but are optional features of the present invention. Alternatively or concurrently limits and/or blocks and/or triggers and/or exclusions can be imposed by other authorized parties as well as the gambler. For example, a block may be for all but $2 gaming machines to prevent the gambler from playing higher stake games. One or more blocks for one or more machines may be included as required. A block may prevent the gambler from gambling at particular times and/or on particular days, e.g., when the gambler receives their wages/salary or during certain hours when the gambler is likely to be, for example, intoxicated and more reckless with their gambling. For example, FIG. 7 shows the maximum gambling session time to be 3 hours, and the maximum session spend to be $100. Weekly, daily, monthly and/or yearly time limits and/or amount limits and/or machine value limits may be specified by the gambler. An option to override the specified limits may be activated or deactivated. Such limits may be set for overall gambling of different types of gambling, e.g. gaming tables, lotto, sports betting, internet gambling and slot machines or for one or more specific types of gambling. The setting of such limits and triggers may be done over the communications network 16 via terminal 15 or via suitably equipped machines 4 at gambling venues.

Figure 9:
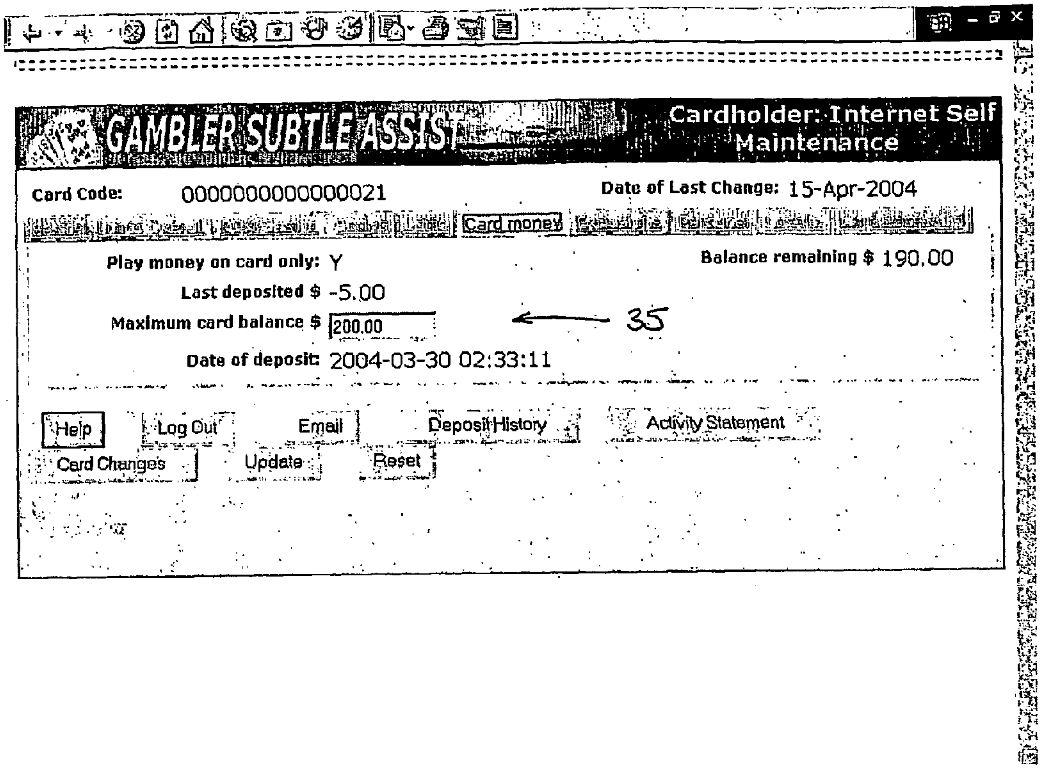
FIG. 9 is a screenshot showing the crediting of an account for use in gambling.

In a preferred embodiment, no money is stored on the identification means 32 in electronic format and therefore loss of the identification means does not result in financial loss for the owner. However, the identification means can be used to pay for gambling. With reference to FIG. 9, a gambler can credit funds to an account stored in the central database 18 via the terminal 15 and the Internet 16 using well known electronic funds transfer means. Once the identification means is verified and gambling is permitted, the account is debited as funds are wagered. The account is credited with wins during and/or at the end of a session.

In an alternative embodiment, the identification means 32 is employed as an electronic wallet that stores money electronically that the gambler can use to pay for gambling. Money is transferred to the identification means 32 via the Internet 16 using commercially available technology. For example, where the identification means is a card, a suitable card reader/writer may be used.

Optionally, the gambler can specify a maximum balance 35 that can be gambled via the identification means 32. Alternatively, the maximum balance can be specified by an authorized other party in the event that this is necessary, as described later herein. The maximum balance feature can be employed in the electronic wallet embodiment or in the embodiment where funds are stored in the central database 18.

The broker/updater module 10 may be a single module or two separate modules, i.e. a broker module coupled to be in communication with an updater module. The broker/updater module 10 receives enquiries from and communicates data to the gambling facility 4 via the venue computer 6 to, for example, check the status of the information relating to the gambler held on the identification means 32. Checking a gambler's status is usually carried out via the communication network 16 by interrogating information stored about the gambler in the central database 18. However, if the communication network 16 is not functioning or the broker/updater module 10 is offline for any other reason, checking of the gambler's status may be carried out by interrogating the offline local database 12 and/or the identification means 32 and returning the gambler's status to the gambling facility 4 to inform the gambler. The broker/updater module 10 is also responsible for encrypting and storing data received from the identification means 32 and transmitting the encrypted data over the communications network to the central operations center 14.

According to one embodiment, the resolver module 22 receives the encrypted data from the broker/updater module 10 via the communications network 16. Once the resolver module 22 decrypts the encrypted data and updates the central database 18, the stored venue record may be deleted. The resolver module 22 checks for self-imposed limits and/or any other limits or triggers. If they exist and are exceeded/activated, a block may be placed on the identification means 32 to prevent the gambler, at their discretion or at the discretion of an appropriately authorized other party, from gambling further. If there is a status change, the offline local database 12 and/or identification means 32 is updated, for example, via a batch update. In one embodiment, as described in further detail herein, the resolver module 22 determines one or more actions to be initiated in relation to the entity and their pursuit of the behaviour.

The application module 26 processes system membership applications and therefore the application module 26 is accessible over the communications network 16 by the public. Hence, applications may be submitted via the Internet. However, the application module 26 also allows for processing of applications by mail and generates a relationship between the system 2, the identification means 32 and the public. In another embodiment, the application module 26 may be accessed via a dedicated machine comprising, for example, a display, keyboard and scanner, to allow applications to be submitted. Such a machine may be located in a gaming venue or elsewhere, such as a shopping mall. In another embodiment, the application module 26 may be accessed by a venue employee in a kiosk or the like who receives and enters applications. In one embodiment, the application module 26 is responsible for updating the central database 18 and the venue offline local database 12.

The modeler module 24 performs periodic comparisons of the information related to the pursuit of gambling stored in the central database 18 for all gamblers against one or more stored models describing one or more categories of gambling behaviour, such as "at risk" gambling, problem gambling and/or compulsive/addictive gambling. Further categorization or classification of the categories of gambling behaviour may be employed, such as low, medium or high or the like. Functions of the modeler module 24 include determining a category of behaviour of the gambler and, in one embodiment, generating a list of those gamblers that meet the criteria of an "at risk" gambler, problem gambler and/or a compulsive/addictive gambler or sub-category thereof. The list may be forwarded to a referral service provider, such as a counselor. The modeler module 24 also separates any stored personal information of the gambler from the unique identifier associated with the identification means 32. The operations of the modeler module 24 and the role of the referral service provider will be described in more detail hereinafter.

The referrer module 28 updates the records generated by the modeler module 24 and performs updates of the records in the central database 18 depending on whether or not there is any action taken by the referral service. For example, a gambler may be referred for counseling to help their gambling problem, but an offer of such help may be declined, as described in more detail hereinafter. The referrer module 24 updates the records in the central database 18 to indicate that the gambler is receiving counseling or that they have declined counseling. The referrer module 24 is also responsible for updating voluntary blocks on gambling created in the central database 18 and releasing such blocks as appropriate. Furthermore, the referrer module 24 is also responsible for updating and removing self-imposed limits stored in the central database 18 and outputting the net result of the referral.

The reporter module 30 is responsible for generating statistics in the system and method of the present invention such as, but not limited to usage by a gambler per gambling facility 4, such as per poker machine 34, demographic and socioeconomic statistics, revenue statistics and the like. The reporter module 30 also monitors statistics such as a payback ratio of the gaming institution, gambling facility productivity, loyalty data for gamblers and institutions and gambling problem identification rates.

A searcher module 20 may also be employed to search for data from the central database 18 as required by the various modules 22, 24, 26, 28, 30 of the central operations center 14 and/or the venue computer 6 and/or broker/updater module 10 of the venue.

Further features of embodiments of the present invention will now be described with reference to FIG. 3.

If a gambler wishes to use a gambling facility 4, such as a poker machine 34 or a gaming table 36, the identification means 32 in the form of, for example, a card must be verified by the gambling facility 4. This may be achieved by, for example, inserting the identification means 32 into a reader 13, shown in FIG. 1, fitted to or otherwise in communication with the facility 4. In one embodiment, the card must remain in the machine 34 throughout the duration of play to ensure that the gambler can only play a single machine at a time. Alternatively, the identification means 32 is removed from the reader 13 after verification by the facility 4 and the identification means may permit the gambler to play a predetermined number of machines simultaneously or cumulatively, e.g. in a predetermined time period, such as in a 12 hour period between specified times. For example, the identification means may permit the gambler to play 5 machines simultaneously or 20 machines in one night.

When the card is inserted into the machine 34, the broker/updater module 10 initiates a check of the status of the gambler via the communications network 16 and the central operations center 14 to verify whether any blocks are in place for that gambler. According to one embodiment, if, for example, a self-initiated block, and/or a block created by another authorized party is in place, approval to gamble is declined and a communication to this effect is returned to the machine 34 preventing the gambler from gambling. Prevention from gambling may be achieved by physically disabling the machine using any suitable electronic and/or mechanical means known in the art. Where no blocks are in place, gambling is permitted on that machine. If the identification means 32 is reported as stolen, a block will be placed on the identification means 32 preventing gambling via that identification means 32.

In the case where the gambling facility is, for example, a gaming table such as a roulette table, a dealer at the table must use the identification means 32 to check that the gambler is permitted to gamble using, for example, the reader 13. Once a gambler is verified as permitted to gamble or otherwise, as described above, the gambler's money may be exchanged for chips by the dealer to enable the gambler to participate. Money may be debited from the gambler's central account or the identification means 32 if it is being employed as an electronic wallet.

Once the gambler is permitted to gamble, the gambling behaviour of the gambler is monitored and information related to the gambling by the gambler is stored by storage means 18. According to one embodiment, each transaction is registered by the system. A transaction is considered to be when the gambler exchanges, for example, cash for gambling chips or gambling chips for cash. In another embodiment, each bet, wager and/or gamble placed by the gambler is monitored and information related thereto stored by the system. Information related to gambling by the gambler is periodically communicated to the central operation center 14 via the communications network 16 and stored by storage means 18. For example, a cumulative amount of money gambled in a session and a total gambling time may be stored. Amounts wagered per gamble and the number of gambles may be recorded. Amounts won and lost and the frequency thereof may be stored. Additional and/or alternative information related to the gambling behaviour of the gambler may be stored by storage means 18.

In one embodiment, where limits/triggers have been set, the stored information, such as the cumulative amount of money gambled and/or total gambling time values, are compared against self-imposed limits/triggers and/or any appropriately authorized other party-imposed limits and/or triggers and if the limit and/or trigger is approaching or has been exceeded the gambler is notified. In one embodiment, whether the gambler is permitted to override the limit is determined by the gambler and/or the appropriately authorized other party when the gambler applies for the identification means 32 or afterwards. For example, overrides of limits may initially be permitted, but where limits are continually overridden, the modeler module 24 may determine that such behaviour warrants that permission to override limits be at least temporarily denied. Hence, any overrides of the limits are reported to the modeler and in a preferred embodiment are considered when determining the category of behaviour of the gambler. Overrides of limits are discussed in further detail herein. Overrides of the limits are also recorded against the gamblers personal record for later reporting to the gambler, which provides valuable data for analysis.

In one embodiment, at least when the identification means 32 is removed from the gaming machine or swiped at a cashier point, e.g. when a gambler cashes in their chips, the central database 18 is updated with each of the gambler's activities. Update of the central database 18 may also occur during gambling. The update will include, but is not limited to, amount gambled, time spent gambling, money won or lost, credits won or lost, time between successive gambling activities, machine or gambling facility identification and/or venue and/or if a gambler has requested a copy of their gambling history.

Figure 3:
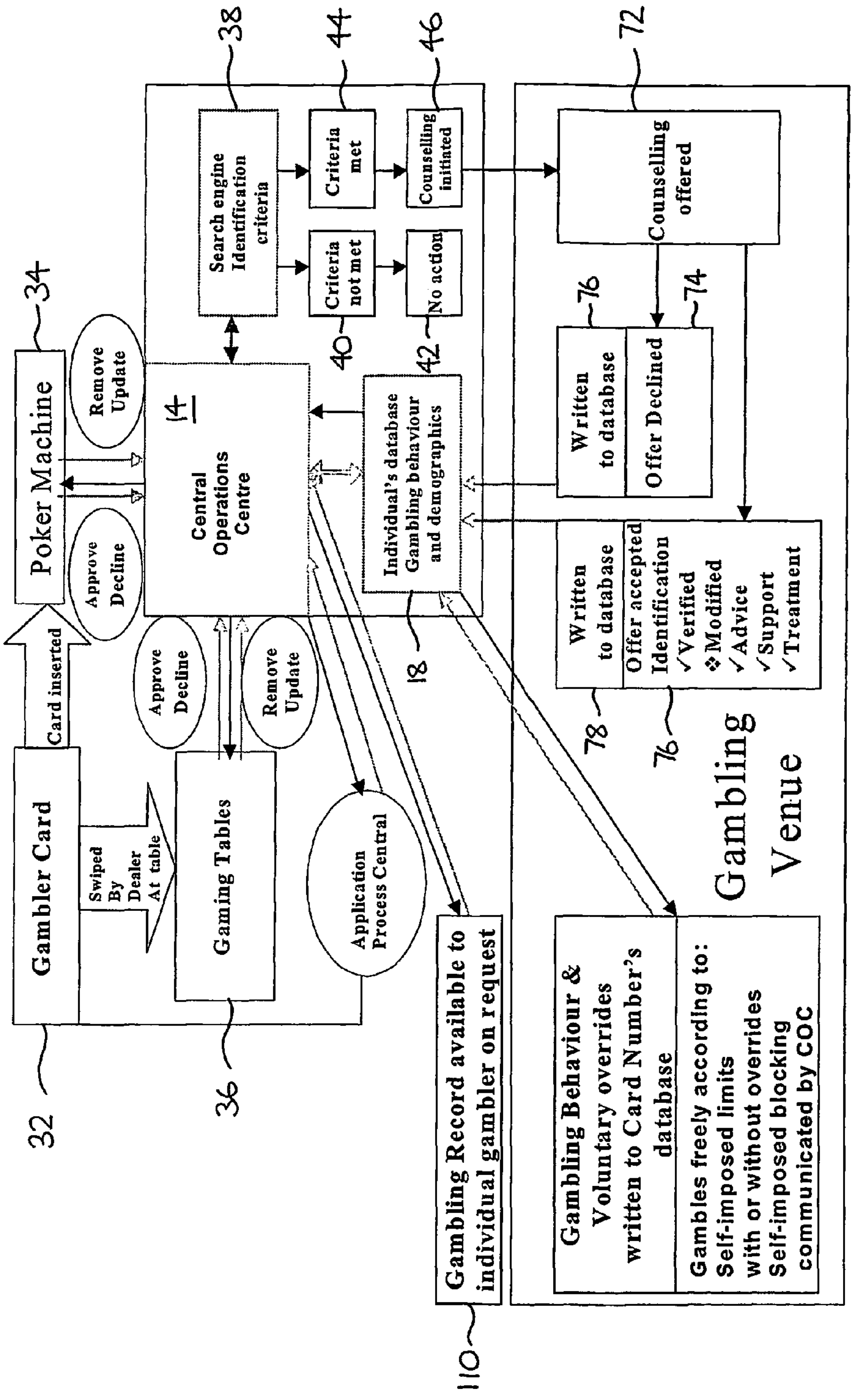
FIG. 3 is a schematic representation of some of the elements of the system and some of the method steps of an embodiment of the present invention.

With reference to action 38 in FIG. 3, in one embodiment of the invention, periodically, e.g. hourly, daily, weekly and/or monthly, the modeler 24 compares the records of information stored in the central database 18 for each gambler against one or more models for determining a category of gambling, such as "at risk", problem, compulsive and/or addictive gambling, or one or more sub-categories thereof, such as a high "at risk" gambler or low problem gambler. If the one or more identification criteria for a category of gambling such as "at risk", problem, compulsive and/or addictive gambling are not met 40, no action is taken 42. However, in one embodiment, it will still be recorded that the comparison between the stored information relating to the gambler's behaviour and the behaviour model yielded a nil result and a date that the comparison was made.

If one or more of the behaviour model criteria are met 44, in one embodiment, a counseling process is initiated 46 based on the identification number or other unique identifier of each identification means 32 held by a gambler meeting the criteria. The counseling process will be discussed in more detail later herein. However, counseling is just one option available in the system and method of the present invention when the modeler module 24 determines a gambler's behaviour to correspond to a particular category of behaviour. For example, if a gambler is categorized as an at risk gambler, imposing one or more limits or blocks may be more suitable than immediately referring the gambler for counseling. Such limits may be in the form of gambling time limits, monetary limits or the like of the type described herein.

Figure 4:
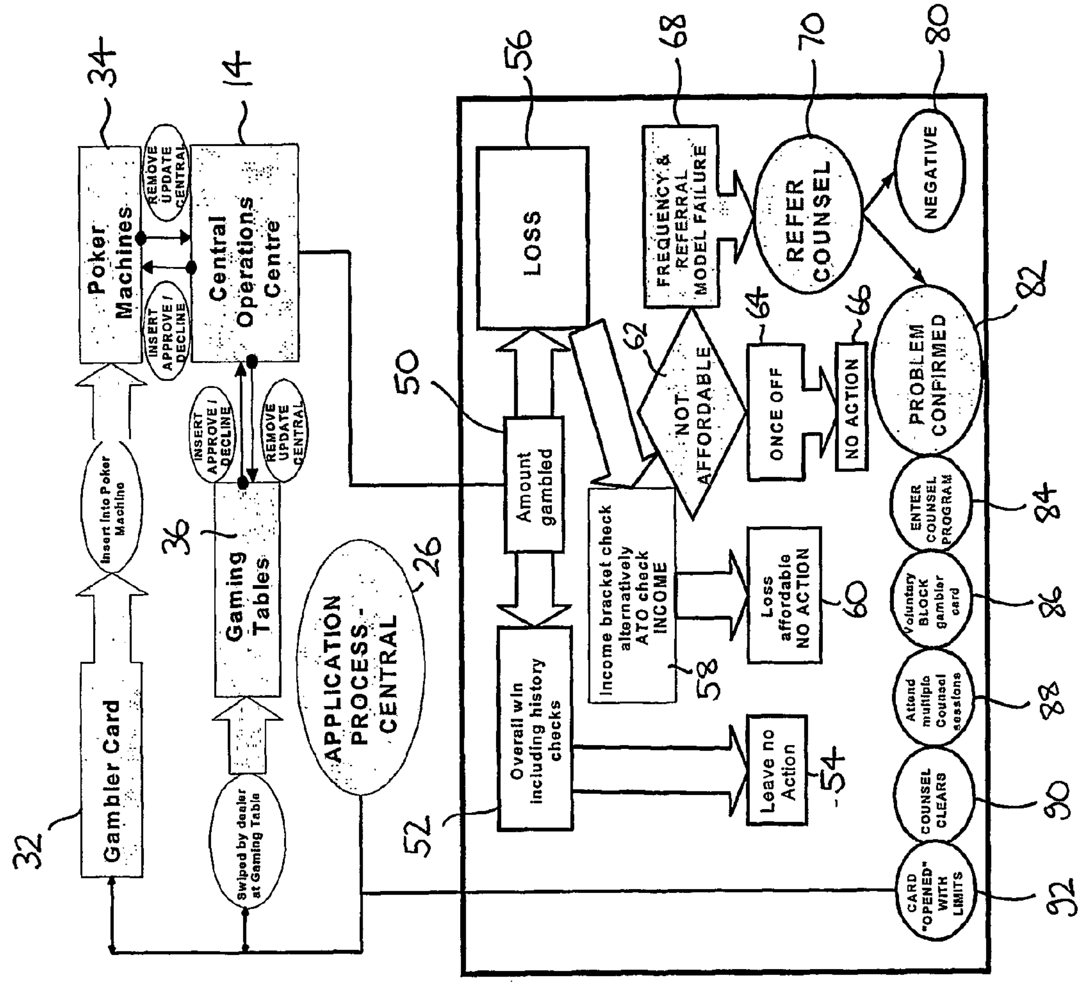
FIG. 4 shows an example of identification criteria for identifying problem gambling and potentially problem gambling.
Figure 5:
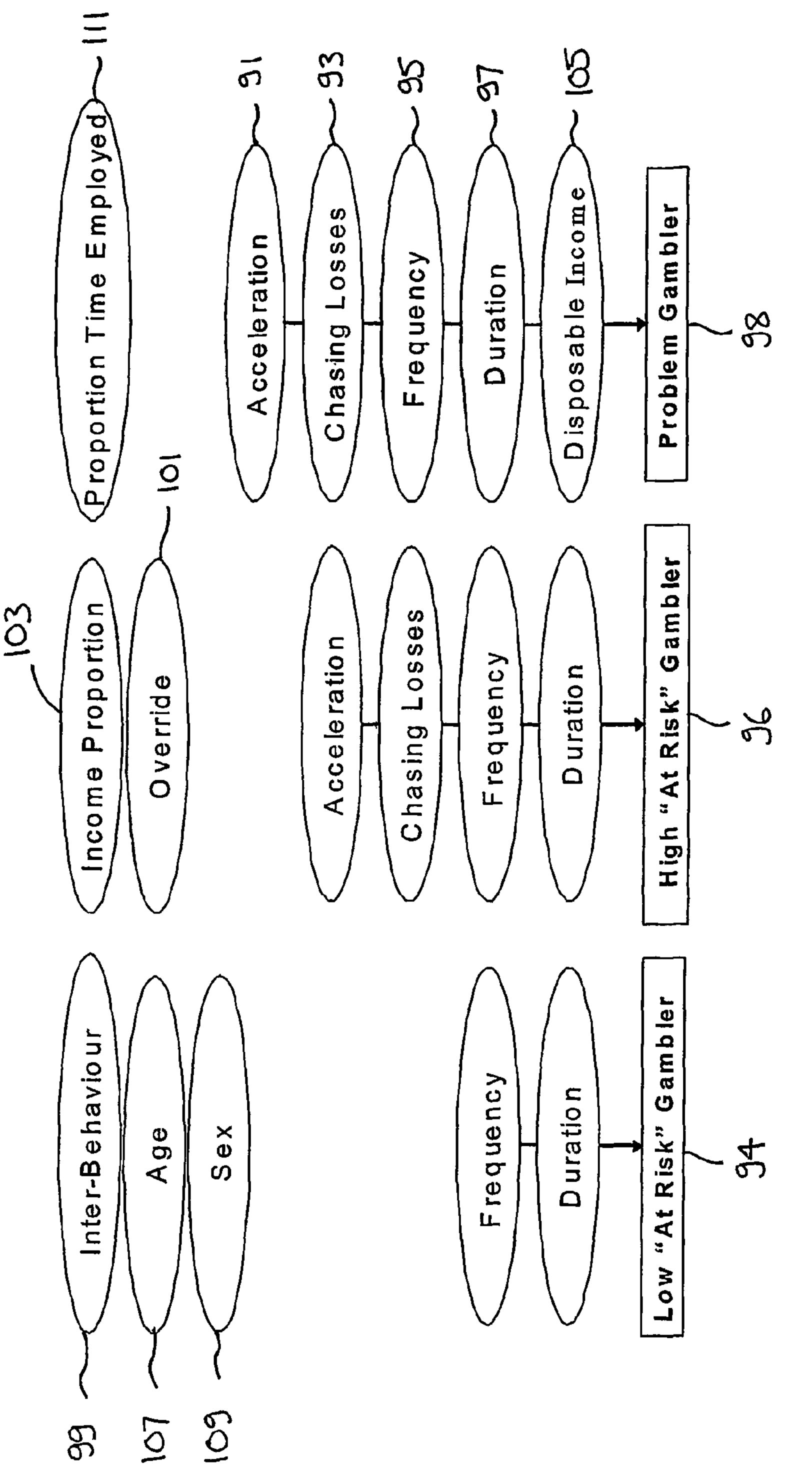
FIG. 5 shows criteria that may be considered to classify gamblers.

Examples of the identification criteria for determining a category of behaviour such as problem gambling are shown in FIGS. 4 and 5. In step 50, the amount gambled is determined as an overall win or loss. Where the gambler has won as shown in step 52, no action is taken, step 54, in this embodiment. Where the gambler has lost as shown in step 56, the magnitude of the loss is compared against a value, such as an income, or income bracket of the gambler, where such information has been provided by the gambler, or previous gambling wins and losses, i.e. earlier behaviour of the gambler, as represented by step 58. The income value may be, for example, a disposable income or an amount the gambler is prepared, or can afford, to lose, which may be specified by the gambler upon applying for the identification means 32. Alternatively, an income or income bracket may be obtained by referring to records of the taxation office of the jurisdiction in which the venue is situated. In another embodiment, an "afford to lose" figure is determined from a credit score assigned to the gambler. The credit score can be determined from information provided by the gambler, such as one or more of income, outgoings, number of dependents and/or similar relevant information.

In one embodiment, the gambler is only permitted to gamble the "afford to lose" figure in a prescribed period, such as one month. In an alternative embodiment, the gambler is permitted to exceed the "afford to lose" figure a limited number of times. In a prescribed period, such as one month, if the gambler exceeds the "afford to lose" figure, or exceeds the "afford to lose" figure beyond the permitted number of times, the identification means 32, and therefore their means of gambling, could be at least temporarily suspended. The term of the suspension may be for a prescribed period, such as one month. Alternatively, it may be for the remainder of the month in which the "afford to lose" figure was reached or exceeded. A further alternative could be until the amount by which the "afford to lose" figure was exceeded is reduced or paid off completely. Suspension may continue until some other stipulated guidelines are satisfied.

With reference to step 60, if the loss is determined to be affordable by the gambler following comparison with the "afford to lose" figure, no action for this identification criteria check is taken. However, with reference to step 62, if the loss is determined not to be affordable by the gambler, if this is a once off occurrence of an unaffordable loss for the gambler, as shown in step 64, in this example, no action is taken as shown in step 66. However, the criteria may be set up such that any unaffordable loss and/or a trigger, e.g. a gambler not requesting a copy of their historical behaviour over a period of time, results in further action. With reference to step 68, if the unaffordable loss fails a frequency and referral aspect of the behaviour model, e.g. the unaffordable loss exceeds a predetermined number of unaffordable losses for that gambler in a particular period, the gambler is referred to counseling as shown in step 70.

The one or more behaviour models used in the embodiments of the present invention to determine a category of behaviour and identify, for example, "at risk" gambling, problem gambling and/or compulsive gambling and/or subcategories thereof, incorporate developments of known criteria from the internationally recognized Diagnostic Statistical Manual of Mental Disorders (DSM-1V), Edition 4 and the South Oaks Gambling Screen (SOGS) for problem gambling, but draw conclusions based on actual gambling behaviour recorded for each respective gambler and is not reliant on the honesty or accuracy of the gambler disclosing their behaviour or disclosing details about their personal circumstances such as income or outgoings or the like.

The behaviour model of at least one embodiment of the present invention is based on statistical modeling and current psychological understanding and includes the ability for an appropriately authorized other party to specify limits and/or triggers that can be imposed on the gambler. It is also dynamic in that it relies on up to date information as well as earlier, i.e. historical behaviour patterns. The historical behaviour may be that of the entity whose category of behaviour is being determined. Alternatively, the historical behaviour may be that of a distribution of other entities. However, the reader will appreciate that the present invention is not limited to the particular DSM-1V and/or SOGS criteria specified herein and suitable alternative criteria developed by other institutes for identifying categories of behaviour such as problem or "at risk" behaviour and the like may be employed.

The identification criteria include research-based criteria, demographic criteria and current information obtained from the gambler's activities as monitored and recorded by the system of the present invention. With reference to FIG. 5, research-based criteria include an acceleration criterion 91, whereby the gambling involves wagering increasing amounts of money, a chasing losses 93 criterion, whereby gambling increases after significant losses are incurred, a frequency criterion 95, which involves the number of hours and/or days spent gambling, a duration criterion 97, which involves the duration of each gambling session, an inter-gambling criterion 99, which involves the duration between successive gambling activities, an override criterion 101, which involves whether the gambler has overridden or attempted to override any limits, triggers, blocks or exclusions imposed by the gambler or generated by the modeler module 24 and the frequency of the overrides or attempts and/or an income proportion criterion 103 that involves the proportion of the gambler's disposable income spent on gambling, if such information has been provided by the gambler. Demographic criteria include a disposable income criterion 105 of the gambler, an age criterion 107, a sex criterion 109, and a proportion of time spent employed criterion 111.

At least some of these criteria will also be applicable to behaviour other than gambling. For example, where the behaviour is the consumption of intoxicating substances such as alcohol, many of the criteria, such as the acceleration criterion, frequency criterion, duration criterion, override criterion, sex criterion, income proportion criterion, sex criterion and age criterion will be applicable in the behaviour model for determining whether the entity has a drinking problem or is "at risk" or falls into another category. For other types of behaviour, the inter-gambling criterion is referred to as the inter-behaviour criterion.

In one embodiment, if a gambler overrides or attempts to override a limit, trigger, block or exclusion that has been generated by the modeler module 24, such an override or attempt to override will be attributed a different weight than if the gambler overrides or attempts to override a self-imposed limit, trigger, block or exclusion. In one embodiment, the different weight will be a greater weight. This is because a limit, trigger, block or exclusion generated by the modeler module 24 will have been generated on the basis of the gambler's monitored behaviour after comparison with one or more behaviour models and the limit, trigger, block or exclusion is considered necessary for the protection of the gambler. Self-imposed limits, triggers, blocks and/or exclusions may be precautionary and are likely to be less indicative of the gambler's actual behaviour.

FIG. 5 shows the various criteria that may be considered to aid classification of a gambler as a low "at risk" gambler, a high "at risk" gambler or a problem gambler according to one embodiment of the invention. For example, where a gambler's activity meets the research-based criteria of acceleration, chasing losses, frequency and duration, the gambler would be classified as a high "at risk" gambler. FIG. 5 also shows other criteria that may be considered when determining the category of behaviour of an entity.

Figure 6:
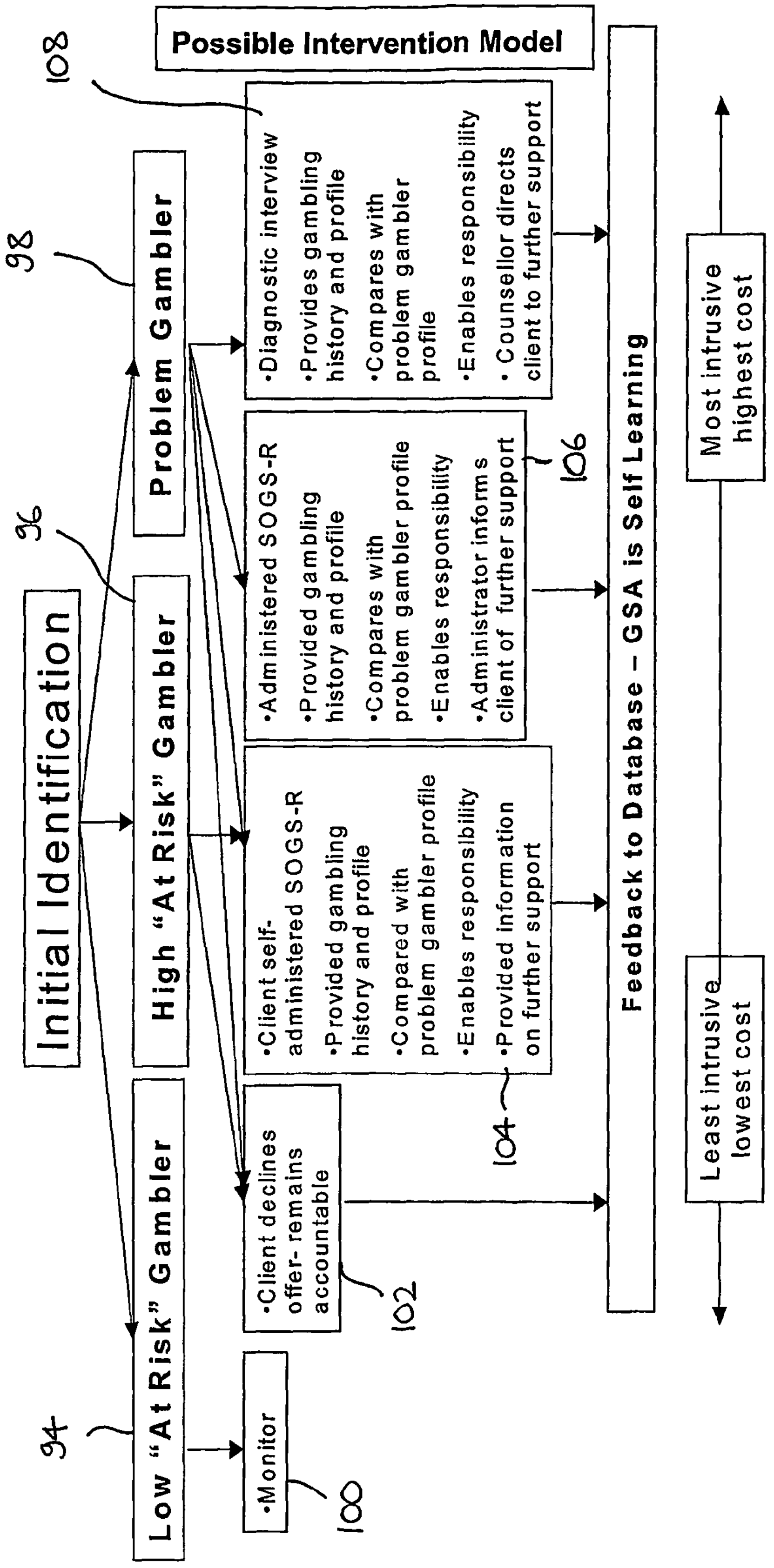
FIG. 6 shows activities that may take place once a gambler has been classified.

FIG. 6 shows the various activities that may take place where a gambler is classified as a low "at risk" gambler 94, a high "at risk" gambler 96 or a problem gambler 98 according to one embodiment of the invention. With reference to step 100, once a gambler is identified as falling into one of the aforementioned categories, a low "at risk" gambler may be monitored more closely, e.g. by comparing a gambler's behaviour against the identification criteria on a more regular basis. The low "at risk" gambler may be offered counseling that may result in no problem being identified, as shown in step 80 in FIG. 4. Alternatively, as shown in step 102 in FIG. 6, the offer of counseling may be declined, which is recorded by the central database 18, but the gambler remains accountable. This may also apply for a high "at risk" gambler or a problem gambler.

With reference to step 104 in FIG. 6, a high "at risk" gambler may administer a SOGS themselves, or an alternative version, such as SOGS-R (Revision R) or a suitable alternative instrument as referred to above. The high "at risk" gambler may be provided with a copy of their gambling history and a profile along with a profile of a problem gambler for comparison. This has the potential to highlight the nature and extent of the problem to the gambler and allows them to take responsibility for their actions. They are also provided with further information and support. These activities may also take place for a problem gambler, as shown in step 106, except that the SOGS-R or other assessment method is performed by an administrator and the administrator informs the gambler of further support, since the problem gambler is perceived as requiring further assistance than a high "at risk' gambler.

With reference to step 108, a problem gambler may alternatively receive a diagnostic interview with a counselor followed by being provided with their gambling history and profile. This can be compared with that of a problem gambler to help highlight the problem. The counselor can then direct the gambler to receive further support. In each case, the central database 18 is updated with the results of the activities.

Referring to FIG. 3, where counseling is offered 72 to the gambler, it may be declined 74 by the gambler. The fact that the gambler refused counseling is recorded 76 by the central database 18 against that gambler's record. If counseling is accepted 76, this is also recorded 78 by the central database 18 against that gambler's record.

With reference to FIG. 4, where counseling is accepted, counseling may determine that no problem exists as represented by step 80. Alternatively, a problem may be confirmed, as shown in step 82. The gambler may then enter a counseling program, step 84, and a block will be placed on the gambler's identification means 32, as shown in step 86, to prevent further gambling. Alternatively, where it is considered appropriate, the gambler may be permitted to continue gambling, but under restricted circumstances. For example, monetary and/or time limits may be set that cannot be exceeded. Alternatively or additionally, the maximum balance permitted to be gambled in a prescribed time period may be reduced. This may be achieved by limiting the available balance stored on the identification means 32 or stored by storage means 18. Alternatively, or additionally, this may be achieved by changing any configurable aspect of operation of the gambling facility 4. Where a gambler overrides any limits, triggers, blocks or exclusions, if permitted, these will be recorded and attributed the appropriate weight according to whether they are self-imposed or generated by the modeler module 24.

With reference to step, 88, the gambler then attends multiple counseling sessions, which may include contact with an individual counselor, psychiatrist and/or psychologist, group therapy, support group work and/or financial counseling/planning. It is envisaged that counseling may be at an individual or family unit level. The self-imposed limits and blocking features of the identification means 32 provide the gambler with a self-management tool and may provide a basis for valuable treatment strategies. As represented by step 90, when the counselor, psychiatrist and/or psychologist consider that the gambler has received sufficient treatment, the gambler may be cleared for further gambling. As represented by step 92, the block will be removed from their identification means 32 to permit gambling and the card preferably comprises new or updated limits, triggers, blocks and/or exclusions to carefully monitor the gambler's activities and to identify any further problems. The updated limits will be recorded in the central database 18.

In the preferred embodiment of the present invention, an "at risk", problem or compulsive gambler is determined by comparison of the gambler's actual behaviour with one or more models, as described above, without the need for one or more gambling limits. The gambling limits, whether self-imposed or imposed by an authorized other party, and information relating to them being reached and/or exceeded, provide useful additional information in the determination of a behaviour category for the gambler, but are not essential.

Embodiments of the present invention allow the aforementioned, optional gambling limits to be exceeded without the automatic determination by the system that the gambler is a problem or even "at risk" gambler. The gambler may specify that they can be stopped from gambling or that self-imposed limits can be overridden. The present invention takes into consideration the usual behaviour of the gambler and/or the gambler's behaviour in comparison with other gamblers in the community. The present invention also takes into consideration that anomalies in behaviour may occur, but that these do not necessarily mean that the gambler has become an at-risk gambler. For example, a self-imposed limit may have been purposely set at a low level by the gambler as their own "early warning system". The system may permit limits to be exceeded, for example, a specified number of times per time period, e.g. 3 times in one month, before any consequential action may occur. Permission may be given by the gambler or an authorized third party. Alternatively, the authorized third party may mandate that limits cannot be exceeded. Each time a limit is exceeded, where it has been elected or not otherwise prevented by mandate, a targeted message may be sent to the gambler via the gambling facility 4 at which the gambler is playing or by email or SMS or mail or other means.

According to one embodiment of the present invention, in response to the modeler module 24 determining that a gambler's behaviour falls into a particular category, such as an "at risk" gambler, the system has the capacity to change the operation of the gambling facility 4 in an attempt to help the gambler address their problem. The resolver module 22 sends instructions to the gambling facility 4 via the venue computer 6 to change the gambling facility parameters, such as preventing play, periodically preventing play, limiting a maximum monetary amount bet, limiting the number of games played simultaneously, such as limiting the number of lines, hands, throws, spins played, limiting the number of games played consecutively, such as a maximum of 20 spins, hands, spins, throws, reducing the speed at which the game is played such as reducing the speed at which game reels are spun. Other changes of parameters are envisaged that will depend on the type of behaviour being pursued and in the case of gambling, the type of game being played and any configurable options available. Such changes would be for the gambler playing with a particular identification means 32 and all changes would be monitored and authorized by the venue computer for compliance with local gaming legislation or the like.

The system and method also accommodates interstate and overseas visitors by issuing visiting gamblers with an identification means 32 such as a card as described above upon the provision of suitable identification. Where the system and method of the present invention are implemented on a national basis, interstate visitors will be subject to the counseling referral aspect of the invention. It is envisaged that overseas visitors would not be subject to the counseling referral aspect, although it could be feasible. For statistical purposes, data from both interstate and overseas visitors would be stored in the central database 18. So called "high rollers" would also be issued with an identification means and their statistical data stored as described above, although the duty of care issues remain with the gaming establishment in which the high roller is playing.

The method and system of the present invention thus provide a solution to problematic and/or compulsive addictive behaviour such as problem gambling. This is achieved by preventing anyone from partaking in certain behaviour in a particular jurisdiction or venue without the identification means 32, the identification means having been acquired on the basis of a minimum of information about the entity, thus preserving their privacy. The system and method provide an early indication of at risk entities, such as gamblers, on the basis of actual behaviour monitored by the system and can impose one or more limits, triggers, blocks and/or exclusions at the election of the gambler or authorized third party and/or offer counseling before a problem develops rather than afterwards. The rapid identification of any problem enables the system and method to target limited counseling resources to at risk and problem entities rapidly, thus reducing the likelihood of longer term counseling being necessary.

The system and method does not rely on the entity recognizing their problem and/or referring themselves for help once the problem has occurred and brings the entities' behaviour to their attention. If a problem occurs, the statistical information provides all the necessary data to evidence the problem to the entity. The system and method does not rely on the entity honestly disclosing their compulsive addictive habits or accurately remembering them or the entity disclosing other details about their circumstances such as their income. The present invention also prevents underage participation in particular activities/behaviour since a person cannot obtain the identification means if they are under the legal age for the activity and cannot partake in the activity without the identification means.

Furthermore, the system and method makes the individual responsible and accountable, but provides multiple mechanisms for receiving assistance if a problem occurs, the nature of the assistance depending on the extent of their problem. Nonetheless, the system and method do not infringe on civil liberties since entities are permitted to partake in a legal activity and maintain their privacy. Entities are also permitted to access their record held by the central database 18 at any time upon request, as shown at 110 in FIG. 3. Entities may be permitted access to their records via the Internet 16.

The system and method provide an accurate and objective database of statistics that enables the industry concerned, authorized other party, if any and government to address and monitor the issue of problem behaviour and provide additional services to associated groups. The reliable, accurate statistics derived from real activities will serve to ameliorate the sometimes excessive and unfounded responses of certain sectors to problem/compulsive/addictive behaviour such as gambling. The collated statistics can: facilitate monitoring of payouts of electronic gambling machines and other forms of gambling facilities; help determine the appropriateness of the quantity and distribution of facilities that enable pursuit of behavior such as gambling, consumption of intoxicating substances and the like; provide patterns of "normal' and "abnormal" behaviour within a particular jurisdiction at any point in time; provide guidance to members of the relevant industry, governmental and regulatory bodies; provide loyalty and frequent participation data to those offering the facilities with the entity's permission; evidence the exercising of a duty of care to participants of the relevant behaviour; determine the potential sustainability of particular forms of behaviour, such as borrowing or gambling and particular forms of it; and report on the extent of the problem according to the particular definition and/or classification of the problem.

The self-imposed limits and blocks and/or limits, triggers and blocks imposed by an appropriately authorized other party that may be associated with the identification means provide a mechanism for the entity to restrain their behaviour that doesn't rely on the entity's will power whilst in the throes of pursuing their behaviour. Such blocks, limits and/or triggers may also result in more successful treatment than a total block on any particular behaviour, such as gambling, in the event that a problem arises.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A system for facilitating responsible gambling by a human entity, said system comprising:
- an identification device to identify the human entity and required to pursue gambling;
- a gambling facility to verify the identification device and to facilitate pursuit of gambling;
- a storage device in communication with the gambling facility to store information related to the pursuit of gambling by the human entity, said information based at least on monitoring actual pursuit of gambling by the human entity; and
- a modeler module in communication with the storage device to identify whether the human entity has a gambling problem and/or exhibits gambling behavior that may become problematic by comparing at least some of the stored information based on monitoring actual pursuit of gambling by the human entity with at least one behavior model;
- wherein the at least one behavior model determines one or more categories of gambling behavior based on statistical modeling, the at least one behavior model comprising:
- up to date information about the actual pursuit of gambling by the human entity;
- information on the psychological understanding of gambling behavior; and
- historical gambling behavior patterns describing:
  - gambling behavior of the human entity determined from the monitoring of the actual pursuit of gambling by the human entity; and gambling behavior of a distribution of other human entities determined from monitoring of the actual pursuit of gambling by the other human entities, and whereby the system facilitates responsible gambling by the human entity by using the modeler module to identify a category of gambling behavior for the human entity.

2. The system of claim 1, wherein the behavior model describes one or more categories of the gambling behavior selected from the following: at risk gambling behavior, or a sub-category thereof; problem gambling behavior or a sub-category thereof; and compulsive/addictive gambling behavior or a sub-category thereof.

3. The system of claim 1, wherein the modeler module compares at least some of the stored information based on monitoring actual pursuit of the gambling by the human entity with at least one gambling behavior model describing earlier gambling behavior of the human entity.

4. The system of claim 1, wherein the behavior model comprises one or more criteria related to the gambling behavior.

5. The system of claim 4, wherein the criteria include one or more of: an acceleration criterion, a chasing losses criterion, a frequency criterion, a duration criterion, an inter-behavior criterion, an income proportion criterion, an age criterion, a sex criterion, an override criterion, a disposable income criterion, and a proportion of time spent employed criterion.

6. The system of claim 1, wherein the modeler module considers whether any limits, blocks, triggers and/or exclusions related to the human entity have been activated in determining the category of behavior of the human entity.

7. The system of claim 1, wherein the modeler module considers whether any limits, blocks, triggers and/or exclusions related to the human entity have been overridden or have been attempted to be overridden by the human entity in determining the category of behavior of the human entity.

8. The system of claim 1, wherein the modeler module attributes a different weight to the human entity overriding a limit, trigger, block and/or exclusion generated by the behavior model than to the human entity overriding a self-imposed limit, trigger, block and/or exclusion.

9. The system of claim 1, further comprising a resolver module for checking whether limits, blocks or triggers related to the human entity have been activated.

10. The system of claim 9, wherein in response to the activation of one or more limits, blocks or triggers related to the human entity, a targeted message is sent to the human entity.

11. The system of claim 10, wherein the targeted message is one or more of: an electronic message sent to the facility, an SMS message sent to a portable communication device of the human entity, an email sent to an email address of the human entity, mail sent to a mailing address of the human entity, and a verbal message delivered in person to the human entity.

12. The system of claim 10, wherein in response to the activation of one or more limits, blocks or triggers related to the human entity, the resolver module initiates a change to one or more operating parameters of the facility.

13. The system of claim 12, wherein the changes to one or more operating parameters of the facility include one or more of: preventing pursuit of gambling, periodically preventing pursuit of gambling, limiting a maximum monetary amount spent for each pursuit of gambling, limiting a maximum length of time gambling can be pursued, limiting a number of times gambling can be pursued simultaneously, limiting a number of times gambling can be pursued consecutively, and reducing the speed at which gambling can be pursued.

14. The system of claim 12, wherein the changes to one or more operating parameters include one or more of: preventing play, periodically preventing play, limiting a maximum monetary amount gambled per play, limiting a maximum length of time gambling can be pursued, limiting a number of games played simultaneously, limiting a number of games played consecutively, limiting a number of lines or hands or spins or throws of play, and reducing the speed at which games are played.

15. The system of claim 1, further comprising a referrer module for updating information stored in relation to the human entity where the human entity has been referred for assistance in relation to their gambling.

16. The system of claim 1, further comprising a reporter module for generating reports about the pursuit of gambling by the human entity.

17. The system of claim 1, wherein the identification device stores only a unique identifier for identifying the human entity and no other information relating to the human entity.

18. The system of claim 1, wherein funds required to pursue gambling are stored electronically by the storage device.

19. The system of claim 1, wherein the identification device electronically stores funds required to pursue gambling.

20. A method for facilitating responsible gambling by a human entity, said method including:

facilitating pursuit of gambling via a gambling facility in response to verifying an identification device identifying the human entity, the identification device required to pursue gambling;

monitoring, via a processing device, actual pursuit of gambling by the human entity;

storing information related to the actual pursuit of gambling by the human entity in a storage device in communication with the gambling facility;

determining one or more categories of gambling behavior based on statistical modeling via at least one behavior model, the at least one behavior model comprising:

up to date information about the actual pursuit of gambling by the human entity;

information on the psychological understanding of gambling behavior; and historical gambling behavior patterns describing:

gambling behavior of the human entity determined from the monitoring of the actual pursuit of gambling by the human entity; and gambling behavior of a distribution of other human entities determined from monitoring of the actual pursuit of gambling by the other human entities; and facilitating, via the processing device, responsible gambling by the human entity by comparing at least some of the information related to the actual pursuit of the gambling by the human entity with the at least one behavior model in a modeler module in communication with the storage device to identify whether the human entity has a gambling problem and/or exhibits gambling behavior that may become problematic by identifying a category of gambling behavior for the human entity.

21. The method of claim 20, wherein determining a category of gambling behavior of the human entity includes comparing at least some of the information related to the actual pursuit of gambling by the human entity with at least one behavior model describing earlier gambling behavior of the human entity.

22. The method of claim 20, wherein determining a category of gambling behavior of the human entity includes comparing at least some of the information related to the actual pursuit of gambling by the human entity with one or more criteria related to the gambling behavior.

23. The method of claim 22, wherein the criteria include one or more of: an acceleration criterion, a chasing losses criterion, a frequency criterion, a duration criterion, an inter-behavior criterion, an income proportion criterion, an age criterion, a sex criterion, an override criterion, a disposable income criterion, and a proportion of time spent employed criterion.

24. The method of claim 20, including considering whether any limits, blocks, triggers and/or exclusions related to the human entity have been activated.

25. The method of claim 20, including considering whether any limits, blocks, triggers and/or exclusions related to the human entity have been overridden or have been attempted to be overridden.

26. The method of claim 20, including attributing a different weight to the human entity overriding a limit, trigger, block and/or exclusion generated by the behavior model than a weight attributed to the human entity overriding a self-imposed limit, trigger, block and/or exclusion.

27. The method of claim 20, further including sending a targeted message to the human entity in response to the activation of one or more limits, blocks and/or triggers related to the human entity.

28. The method of claim 27, wherein the targeted message is one or more of: an electronic message sent to the facility, an SMS message sent to a portable communication device of the human entity, an email sent to an email address of the human entity, mail sent to a mailing address of the human entity, and a verbal message delivered in person to the human entity.

29. The method of claim 20, further including initiating a change to one or more operating parameters of the gambling facility in response to the activation of one or more limits, blocks and/or triggers related to the human entity.

30. The method of claim 29, wherein the change to one or more operating parameters of the facility includes one or more of: preventing pursuit of gambling, periodically preventing pursuit of gambling, limiting a maximum monetary amount spent for each pursuit of gambling, limiting a maximum length of time gambling can be pursued, limiting a number of times gambling can be pursued simultaneously, limiting a number of times gambling can be pursued consecutively, and reducing the speed at which gambling can be pursued.

31. The method of claim 29, wherein the change to one or more operating parameters of the facility includes one or more of: preventing play, periodically preventing play, limiting a maximum monetary amount gambled per play, limiting a maximum length of time the gambling can be pursued, limiting a number of games played simultaneously, limiting a number of games played consecutively, limiting a number of lines or hands or spins or throws of play, and reducing the speed at which games are played.

32. The method of claim 20, further including referring the human entity for assistance in relation to their gambling.

33. The method of claim 20, wherein the human entity is referred for assistance following categorization of the behavior of the human entity as being at risk gambling behavior, problem gambling behavior or compulsive/addictive gambling behavior or a sub-category thereof.

34. The method of claim 20, further including generating reports about the pursuit of gambling by the human entity.

35. The method of claim 20, further including the identification device storing only a unique identifier for identifying the human entity and no other information relating to the human entity.

36. The method of claim 20, further including storing money electronically in the storage device for pursuit of gambling.

37. The method of claim 20, further including storing money electronically on the identification device for pursuit of the gambling.

38. The system of claim 2, wherein the sub-category includes low, medium or high.

39. The system of claim 1, wherein the information on the psychological understanding of gambling behavior includes criteria from the Diagnostic Statistical Manual of Mental Disorders or the South Oaks Gambling Screen.

* * * * *